United States Patent
Bourlas et al.

(10) Patent No.: US 7,916,641 B2
(45) Date of Patent: Mar. 29, 2011

(54) SYSTEM AND PROCESS FOR PACKET DELINEATION

(75) Inventors: Yair Bourlas, San Diego, CA (US);
Brian D. Petry, San Diego, CA (US);
Peter J. Graumann, Calgary (CA);
Kripps Asirvatham, Escondido, CA (US);
Doraid Y. Sadiq, San Marcos, CA (US);
Karle J. Johnson, Carlsbad, CA (US);
Kenneth L. Stanwood, Vista, CA (US)

(73) Assignee: Wi-Lan, Inc., Ottawa, Ontario (CA)

( * ) Notice: Subject to any disclaimer, the term of this patent is extended or adjusted under 35 U.S.C. 154(b) by 564 days.

(21) Appl. No.: 11/479,871

(22) Filed: Jun. 29, 2006

(65) Prior Publication Data
US 2008/0002567 A1    Jan. 3, 2008

(51) Int. Cl.
G06F 11/00    (2006.01)

(52) U.S. Cl. .................... 370/235; 370/394; 370/509

(58) Field of Classification Search .............. 370/230, 370/235, 389, 394, 503, 509, 510, 511, 512
See application file for complete search history.

(56) References Cited

U.S. PATENT DOCUMENTS

| | | | |
|---|---|---|---|
| 6,310,897 B1 * | 10/2001 | Watanabe et al. | 370/522 |
| 6,895,544 B1 * | 5/2005 | Park et al. | 714/776 |
| 6,983,031 B2 * | 1/2006 | Wheatley | 375/368 |
| 6,993,046 B1 * | 1/2006 | Hernandez-Valencia et al. | 370/470 |

FOREIGN PATENT DOCUMENTS

| | | |
|---|---|---|
| EP | 0942569 A | 9/1999 |
| EP | 1077562 A | 2/2001 |
| WO | WO 9737509 A | 10/1997 |
| WO | WO 2007/104686 A | 9/2007 |

OTHER PUBLICATIONS

"Part 16: Air Interface for Fixed Broadband Wireless Access Systems" IEEE Standard for Local and Metropolitan Area Networks, Oct. 1, 2004, No. 802-16, p. 35-42, 309-328, 493-502.
International Search Report and Written Opinion for PCT Application US2007/014532, dated Dec. 20, 2007, 13 pages.

* cited by examiner

*Primary Examiner* — Jayanti K Patel
*Assistant Examiner* — Bo Hui A Zhu
(74) *Attorney, Agent, or Firm* — Volpe and Koenig, P.C.

(57) ABSTRACT

An error management system and process can be used to identify an erroneous data packet in a data stream. In response to identifying the erroneous data packet, a subsequent valid data packet is located in the data stream. In one embodiment, a plurality of candidate locations of header checksum windows are searched and checked for a valid checksum. Multiple integrity checks of multiple header checksums can be used to reduce the probability of a false positive integrity check. In another embodiment, one or more information data fields can used for determining packet integrity by determining if the fields contain valid information bits.

21 Claims, 8 Drawing Sheets

SYSTEM AND PROCESS FOR PACKET DELINEATION

BACKGROUND OF THE INVENTION

1. Field of the Invention

The field of the invention relates to processing of digital data streams with error management. More particularly, the invention relates to processing of digital data streams with error management in wireless systems.

2. Description of the Related Art

Widespread use of the Internet and wireless communication has increased demand for multimedia services that stream media over the Internet and mobile/wireless channels. In Internet Protocol (IP) networks, multimedia can be provided by a server and can be streamed to one or more wired or wireless clients. Wired connections include dial-up, integrated services digital network (ISDN), cable, digital subscriber line protocols (collectively referred to as xDSL), fiber, local area networks (LAN), wide area networks (WAN) and others. Electronic devices utilizing wireless communications include telephones (e.g., cell phones), personal data assistants (PDAs), hand-held and portable computers and others. In most, if not all of these applications, bandwidth requirements and/or restrictions necessitate that video processing utilize a source encoder incorporating various compression algorithms to analyze, quantify and represent multimedia data to convey the maximum information by expending a "minimum" number of bits.

Both wired and wireless communication links may be prone to errors. A part of transmitted data is "erroneous" when this part of data is lost or corrupted. Any erroneous part of this data lost or corrupted during transmission may impact decoding of the data at the decoder.

Depending on the nature of the channel errors (e.g., bit errors and/or packet loss) and the type of packetization, all or part of the data pertaining to one or more data packets could become erroneous during transmission due to error propagation. Error propagation can be made worse by compression schemes such as CAVLC, spatial prediction, and temporal prediction (e.g., motion compensated prediction) that depend on successful decoding of other portions of data.

Various methods of detecting erroneous packets have been employed including encoding checksums such as cyclic redundancy checks based on a portion of data contained in packet headers and/or the body of the packets. Erroneous packets are then detected and discarded. Some communication networks may support retransmission of discarded packets. However, some communication networks do not support retransmission and the information in discarded packets may be lost, thereby requiring resynchronization of the data stream. Discarding the erroneous packets may result in the data stream being undecodable due to loss of synchronization. Resynchronization points restrict the use of compression schemes such as, for example, CAVLC, spatial prediction, and/or temporal prediction that depend on previously received and decoded data. Thus, providing resynchronization points cuts down on the compression efficiency of the communication link.

Thus, there is a need for an improved method for managing erroneous packets rather than discarding erroneous packets and using resynchronization points in the data stream.

SUMMARY OF THE INVENTION

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other error management solutions.

An embodiment provides a method of processing a data stream comprising a plurality of variable length packets, the method includes determining an integrity of a first packet, and in response to determining the integrity of the first packet to be erroneous, identifying a location of a second packet.

Another embodiment provides a communication apparatus to process a data stream comprising a plurality of variable length packets. In this embodiment, the apparatus includes a memory device, and a processor configured to communicate with the memory device, where the processor is further configured to determine an integrity of a first packet, and in response to determining the integrity of the first packet to be erroneous, to identify a location of a second packet.

Another embodiment provides a computer readable medium embodying a method of processing a data stream comprising a plurality of variable length packets. In this embodiment, the method includes determining an integrity of a first packet, and in response to determining the integrity of the first packet to be erroneous, identifying a location of a second packet.

Another embodiment provides a method of processing a data stream comprising an allocation block having a known length, where the allocation block comprises a plurality of variable length packet data units (PDU). The method includes computing a checksum of a first PDU in the allocation block, determining the integrity of the first PDU by comparing the computed checksum to a header checksum contained in a header of the first PDU, and identifying a location of a second PDU in the allocation block in response to determining the integrity of the first PDU to be erroneous. In one aspect of this embodiment, the method also includes identifying a value of a packet length field contained in the header of the first PDU in response to determining the integrity of the first PDU to be erroneous, and identifying the location of the second PDU by advancing a number of bits in the data stream based on the identified packet length field value.

Another embodiment provides a communication apparatus to process a data stream comprising an allocation block having a known length, where the allocation block includes a plurality of variable length PDU's. The apparatus includes a memory device, and a processor configured to communicate with the memory device. The processor is also configured to compute a checksum of a first PDU in the allocation block, to determine the integrity of the first PDU by comparing the computed checksum to a header checksum contained in a header of the first PDU, and to identify a location of a second PDU in the allocation block in response to determining the integrity of the first PDU to be erroneous. In one aspect of this embodiment, the processor is configured to compute candidate checksums for a plurality of candidate header locations of the second PDU. The candidate header locations are determined by sliding a candidate header checksum window forward an N number of bits at a time where N is an integer. In another aspect, the processor is configured to determine integrity of the plurality of candidate header locations of the second PDU by comparing the computed candidate checksums to header checksums within the candidate headers, and to identify the location of the second PDU to be one of the plurality of candidate header locations resulting in a valid checksum comparison.

Another embodiment provides a computer readable medium embodying a method of processing a data stream comprising an allocation block having a known length. The allocation block includes a plurality of variable length PDU's. The method includes computing a checksum of a first PDU in the allocation block, determining the integrity of the first PDU by comparing the computed checksum to a header checksum contained in a header of the first PDU, and identifying a location of a second PDU in the allocation block in response to determining the integrity of the first PDU to be erroneous.

DETAILED DESCRIPTION OF EMBODIMENTS OF THE INVENTION

A method and apparatus for processing a block of digital data comprising possibly erroneous variable length data packets, where the block of digital data is of a known length, are described. The processing comprises determining the integrity of a variable length data packet and, in response to determining the variable length data packet to be erroneous, identifying a location of a valid data packet in the block. Determining the integrity of the data packet may include the use of checksums and/or cyclic redundancy checks (CRC). Determining the integrity of the data packet may also include validating that the values contained in one or more information fields in the packet and/or packet header are valid values for the particular information fields. Identifying the location of the valid data packet may involve searching the data block for candidate locations of the packet header, and performing integrity checks on the candidate packet header and/or packet body data at each candidate location. Identifying the location of the valid data packet may also include multiple integrity checks to reduce the chances of a false-positive. In the following description, specific details are given to provide a thorough understanding of the disclosed methods and apparatus. However, it will be understood by one of ordinary skill in the art that the disclosed methods and apparatus may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
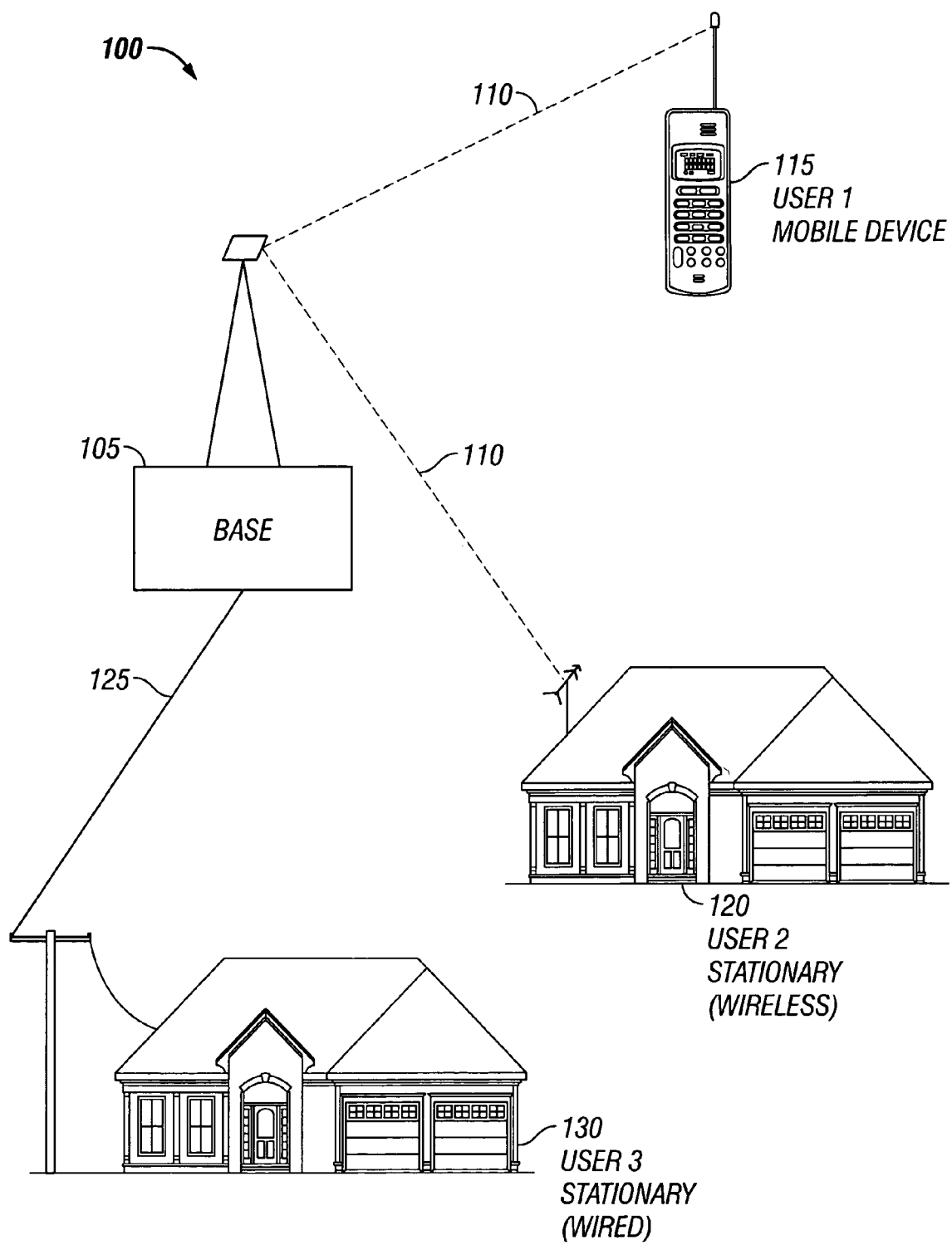
FIG. 1 illustrates a system for distributing digital data to multiple users.

FIG. 1 illustrates a system for distributing digital data to multiple users. System 100 can be a part of any data communication network utilizing variable length packets in one or more parts of the network. The system 100 may be part of a larger network such as the internet, a wired and/or wireless communications network. The system 100 includes one or more base stations 105. The base stations have access to data sources containing various forms of multimedia including music, video, text, graphics, advertisements and others. The sources may be connected to the base station 105 through the internet via wired and/or wireless channels, or the sources may be self contained in the base station 105 in various forms such as CD-ROM, digital video disk (DVD), or a hard disk drive.

The base station 105 can distribute the data over wireless communication links 110. The wireless communication links 110 may comprise, for example, part of a code division multiple access (CDMA or CDMA2000) communication system, a frequency division multiple access (FDMA) system, an orthogonal frequency division multiple access (OFDM) system such as WiMax (IEEE 802.16x), a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques.

The wireless communication links may be received by one or more users of wireless devices such as, for example, mobile device user 115, and stationary wireless user 120. Mobile wireless device user 115 may be using a mobile telephone, a pda, a pager, a lap-top computer or any mobile wireless device. Stationary wireless user 120 may be using a set-top box, a personal computer or another communication device in conjunction with an internal or external receiver.

The base station 105 can also distribute the data over wired communication links such as wired link 125. Wired communication links can include co-axial cable, fiber-optic cable and others. Stationary wired user 130 may be using a set top box, personal computer or other communication device connected to or having access to the wired communication link 125.

The system 100 is shown with only one base station 105, but the system 100 may include multiple base stations connected with other wired and/or wireless links known to those of skill in the art.

Figure 2:
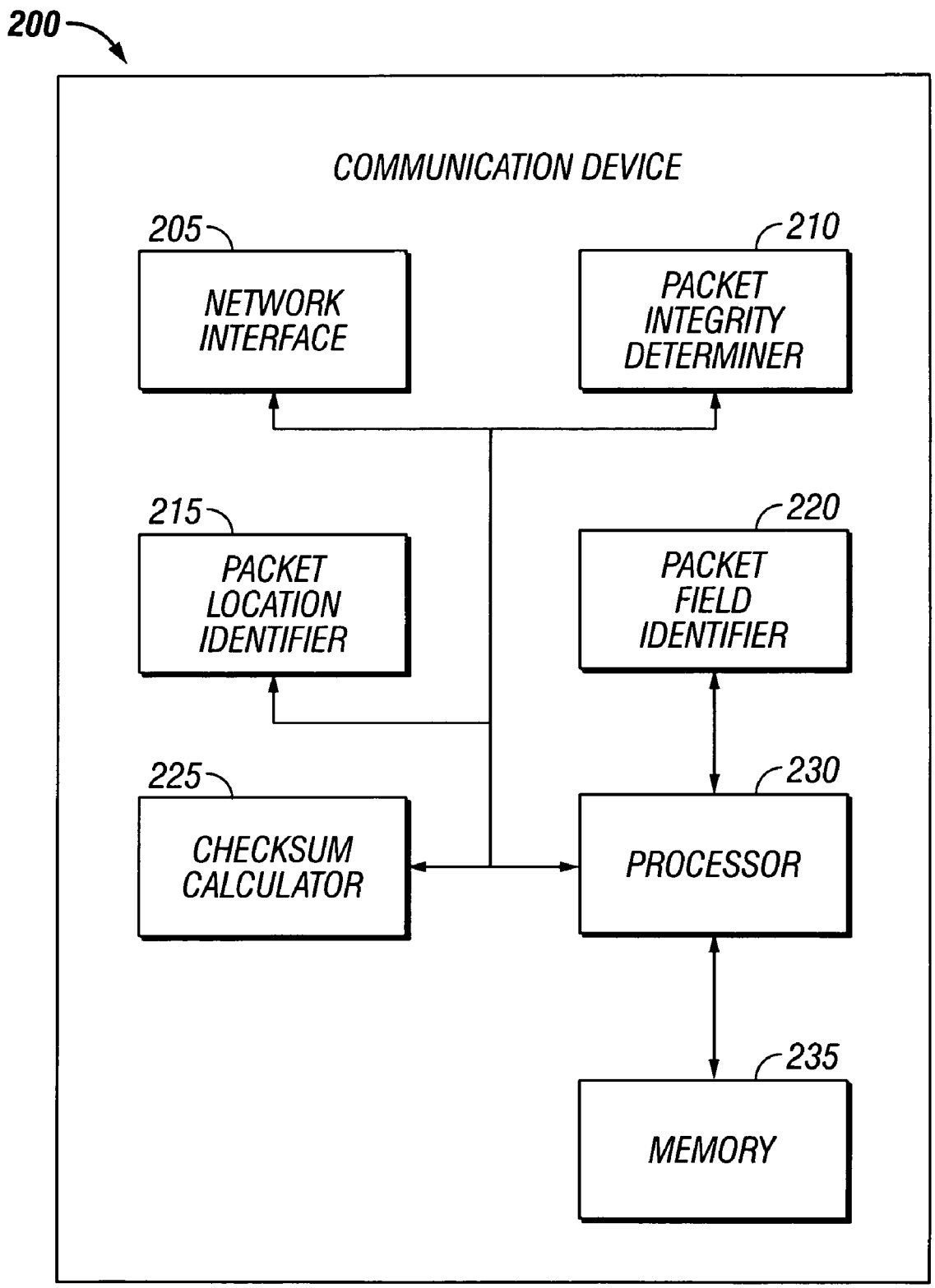
FIG. 2 is a block diagram illustrating an example of a communication system for processing an incoming data stream (not shown).

FIG. 2 shows a block diagram illustrating an example of a communication system for processing an incoming data stream (not shown). The communication device 200 may be part of any wireless device (mobile or stationary) used by wireless users 115 or 120, or any wired device used by wired user 130 as discussed above. Communication device 200 comprises a network interface module 205, a packet integrity determiner module 210, a packet location identifier module 215, a packet field identifier module 220, a checksum calculator module 225, a processor 230, and a memory module 235. The various modules may be implemented in hardware, software or any combination thereof.

The network interface module 205 can receive the data stream from a wired and or wireless network or from an image source such as the internal memory module 235 or external storage (not shown). The memory module 235 and/or the external storage may be a CD-ROM, a digital video disc (DVD) or a hard-disc drive that contains the encoded data comprising the data stream. When the network interface 205 receives data over a wired and/or wireless communication link, it is usually in a bit stream and the network interface demodulates the bitstream to form the demodulated data. The network interface may not have knowledge of, or any need to know, the packetization of the received bitstream. Packet level error management may proceed after the bitstream is demodulated to a point where packets are distinguishable (e.g., in a medium access control or MAC layer, in a transport layer and/or a synchronization layer of a multi-layered protocol stack). Demodulation in the network interface module 205 may include radio frequency demodulation, Fourier transform, error correction and detection schemes, de-interleaving, decryption and other schemes depending on how the data stream was modulated and/or encoded.

The packet integrity determiner 210 contains logic used to determine the integrity of the packets received by the communication device 200. Packets may contain encoded information, e.g., a cyclic redundancy check (CRC) and/or a checksum, which is used to determine the integrity of the packet. From herein, the term checksum is used in a general sense to refer to any kind of error check. The checksum may protect the integrity of data by being used to detect errors in data that is sent through space (e.g., over a communication link) or time (e.g., storage). A checksum may be calculated by simply adding up the components of a message or a portion of a message. For example, a header checksum may be based on the information contained in a packet header. A checksum may also be based on a body of a packet containing a message or a portion of the message. Checksums may be an integer number of bits or bytes. A checksum may also be based on a cryptographic hash function. Unlike a simple additive checksum, a hash function may enable detection of a reordering of the bits in a message, inserting or deleting zero-valued bits or bytes and multiple errors that cancel each other out.

The checksum calculator module 225 calculates a checksum based on the portion of the message that the encoded checksum was based on. The calculated checksum may then be compared to the encoded checksum. If the calculated checksum matches the encoded checksum, then the packet is determined to be valid by the packet integrity determiner 210. If the calculated checksum does not match the encoded checksum, then the packet is determined to be erroneous by the packet integrity determiner module 210.

The packet location identifier module 215 contains logic that is used to locate a packet in a data stream or data block after an erroneous packet has been detected. Details of the logic used by the packet location identifier module 215 to locate subsequent packets are discussed below.

In addition to using checksums to determine the integrity of packets, the packet field identifier module 220 may be used in conjunction with the packet integrity determiner module 210 to determine packet integrity. The packet field identifier module 220 identifies field locations within a packet, where a field is a portion of a message representing a piece of data. The packet field identifier module 220 may determine a value contained in a certain field of a received packet and check the value against a set of valid values that the field may be equal to. If the received value is not in the valid list, then the packet may be determined to be erroneous by the packet integrity determiner module 210. Field values may be context dependent as in CAVLC schemes as discussed above. Examples of various field value integrity checks will be discussed below.

The processor 230 may be any suitable general purpose single- or multi-chip microprocessor, or any suitable special purpose microprocessor such as a digital signal processor, microcontroller, hardwired logic, or a programmable gate array. The processor 230 is configured to execute one or more software applications to control the operation of the network interface module 205, the packet integrity determiner module 210, the packet location identifier module 215, the packet field identifier module 220 and/or the checksum calculator module 225. The processor 230 is also configured to access the memory 235, or external storage (not shown) to read and/or store data. It should be noted that any one of the functional blocks illustrated in FIG. 2 may be rearranged and/or combined with one or more other blocks without changing the function of the communication device 200. For example, the processor 230 and/or the memory 235 may be external to the communication device 200. In certain examples, one or more of the functional blocks as illustrated in FIG. 2 may be removed.

Figure 3:
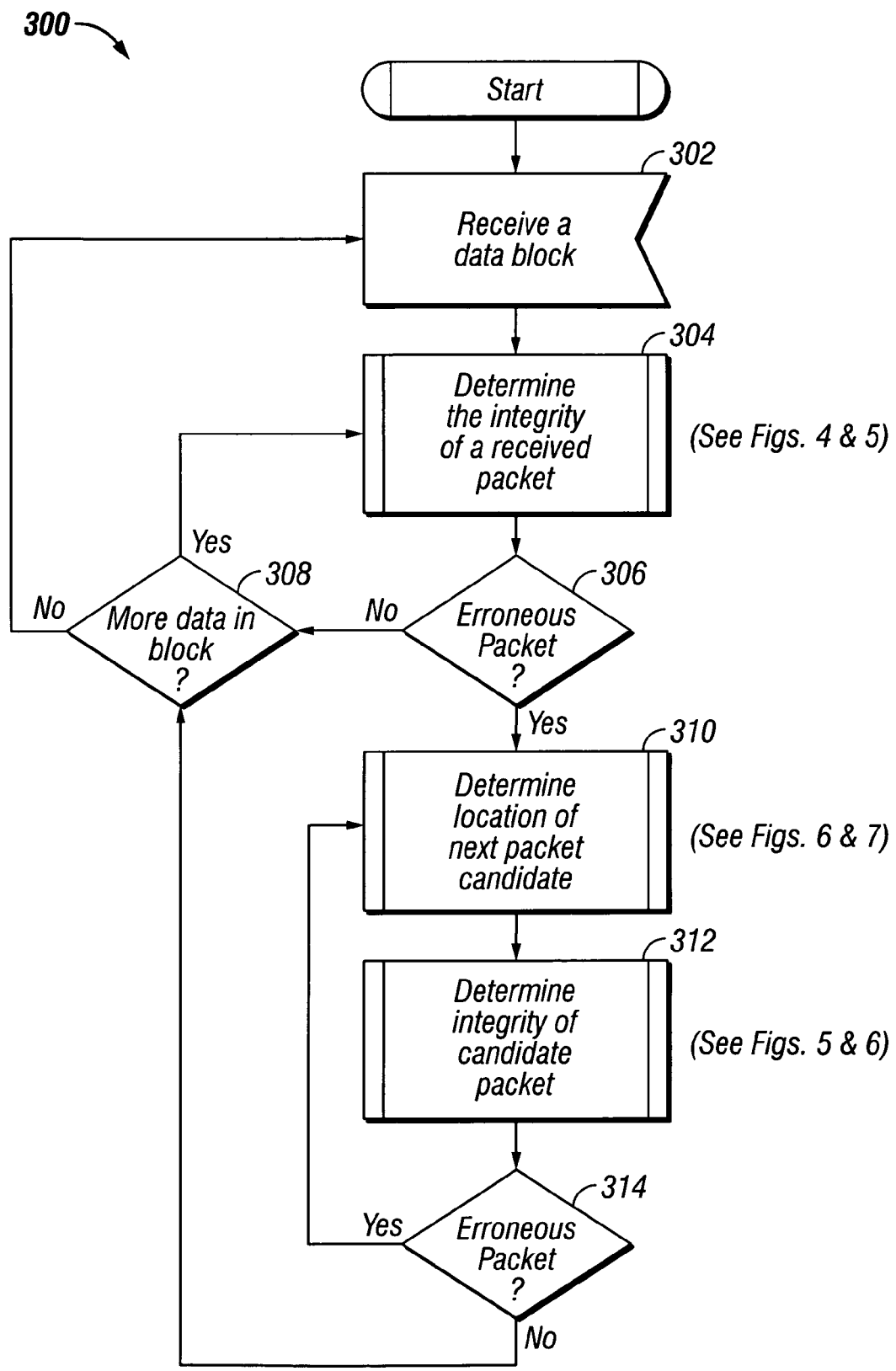
FIG. 3 is a flowchart illustrating certain blocks in a method of processing digital data streams with error management.

FIG. 3 is a flowchart illustrating certain blocks in a method of processing digital data streams with error management. In one embodiment, the process 300 may be performed by the communication device 200. Starting at block 302, a block of data is received. The block of data may be received over a wired or wireless network or received from storage (e.g., internal memory 235 and/or external memory). The data block is comprised of multiple fixed and/or variable length packets. Receiving means such as the processor 230 and/or the network interface module 205 of FIG. 2 may receive the data block at block 302. In one embodiment, the data block is of a known length. In some embodiments the data block may be a fixed length such as a fixed length packet associated with a physical layer, transport layer or other lower layer communication protocol. The multiple packets contained in the received data block may be any types of packets known to those of skill in the art including packets associated with application layer components (including both synchronized packets such as audio and video, and/or unsynchronized packets), packets associated with individual users, packets containing out-of-band messaging, and others.

After receiving the data block the process 300 continues to block 304, where the packet integrity determiner module 210 determines the integrity of a first packet in the received block of data. In some embodiments, the first packet starts at the beginning of the block of data, usually starting with a packet header. Other embodiments may not start the beginning of a block of data with a packet header, but may have other encoded information (e.g., in a data block header or in sideband messages) indicating where the first packet starts. In these cases, the initial portion of the data block may contain a portion of another packet from the previous data block. As discussed above, there are various methods of determining the integrity of a data packet at block 304. Details of some of these methods will be discussed in detail below. Determining means such as the packet integrity determiner module 210 of FIG. 2 can determine the integrity of a received packet at block 304.

Next, at decision block 306, if the integrity determination of block 304 indicates that a data packet is not erroneous, then the packet integrity determiner module 210 forwards the data packet to another component (e.g., an application layer process) for subsequent processing. The process 300 proceeds to decision block 308 to determine whether there are more packets in the data block. If there are more data packets, then process 300 returns to block 304 to determine the integrity of the next packet. If there are no more packets in the received data block, then the process 300 may return to block 302 to receive another data block, or alternatively may transfer to an idle state (not shown in FIG. 3).

Referring again to the decision block 306, if the integrity determination of block 304 indicates that a packet is erroneous, then the process 300 continues to block 310 to determine a candidate location of another packet within the received data block. Example processes of determining a candidate location are described below with reference to FIGS. 6 and 7. After a candidate location of a packet is determined at block 310, the process 300 continues at block 312 to determine the integrity of the candidate packet at the determined location. Example processes of determining the integrity of the candidate packet are described below with reference to FIGS. 5 and 6. In some embodiments, similar integrity checks as are used at block 304 could also be used at block 312 to determine the integrity of candidate packets. In other embodiments, different integrity check methods may be utilized at block 312 than at block 304 to determine the integrity of candidate packets.

Continuing to a decision block 314, if the integrity determination of block 312 indicates that a candidate data packet is not erroneous, then the packet integrity determiner module 210 discards the previous erroneous packet (determined to be erroneous at blocks 304 and 306) and forwards the candidate data packet to another component (e.g., an application layer process) for subsequent processing. Similarly to the case with decision block 306 discussed above, the process 300 proceeds to decision block 308 to check whether there are more data packets in the data block. If there are more data packets, then process 300 returns to block 304 to determine the integrity of the next packet. If there are no more packets in the received data block, then the process 300 may return to block 302 to receive another data block, or alternatively may transfer to an idle state (not shown in FIG. 3).

Referring again to the decision block 314, if the integrity determination of block 312 indicates that a candidate packet is erroneous, then the process 300 continues to block 310 to determine another candidate location of packet within the received data block. Various methods of determining candidate packet locations at block 310 will be discussed below with reference to FIGS. 6 and 7. Identifying means such as packet location identifier module 215 of FIG. 2 can determine the candidate packet location at block 310.

It should be noted that any one of the blocks illustrated in the flowchart shown in FIG. 3 may be omitted, rearranged in order, or combined with one or more other blocks.

Figure 4:
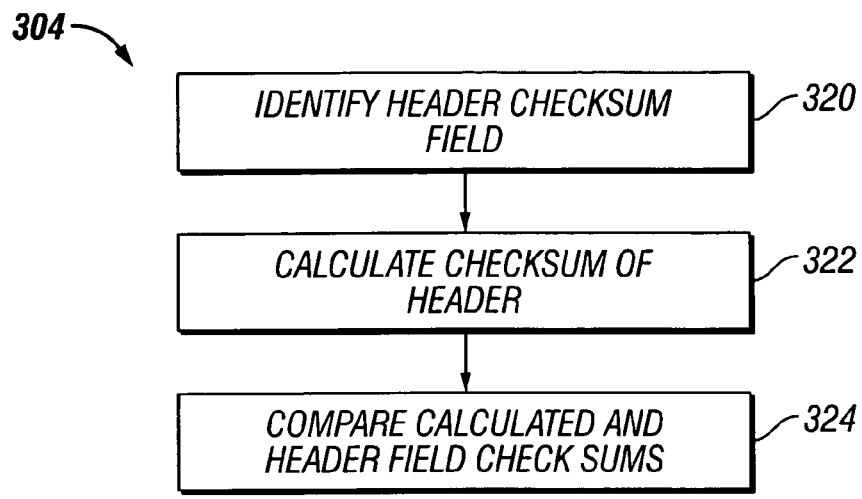
FIG. 4 is a flowchart illustrating an example of the process to determine the integrity of a received packet at block 304 of FIG. 3.

FIG. 4 is a flowchart illustrating an example of the process to determine the integrity of a received packet at block 304 of FIG. 3. In this example, a packet header contains a number of bits in a header field that contain a header checksum. The value of the header checksum field may be determined and encoded by an encoding device that assembled the data packet that has been received. The header checksum can be derived using one of the methods discussed above to encode a value in the header checksum field. The encoded checksum is usually based on a portion of the header, but it could also be based on data contained in the body of the packet. Starting at block 320, the packet field identifier module 220 receives a packet and identifies a header checksum field in the header of the received packet.

Continuing to block 322, in order to verify the integrity of a packet, the communication device 200 may use the method that was used to encode the header check sum to recalculate the header checksum based on the received packet header and/or packet body data. For example, the checksum calculator module 225 shown in FIG. 2 may calculate a checksum, at block 322, based on the header data that was received in the packet. After calculating the checksum based on the received data, the packet integrity determiner module 210 can compare the calculated checksum with the received checksum at block 324. If the calculated checksum matches the received checksum, then the packet is determined to be valid at block 304 of FIG. 3 and the process 300 can proceed as discussed above with forwarding the valid packet to another component for subsequent processing, and determining the integrity of the next packet in the data block. If the comparison at block 324 shows that the packet is erroneous, then the process 300 continues to block 310 to determine a candidate packet location. The process shown in FIG. 4 may also be used to determine the integrity of the candidate packets at block 312 of FIG. 3. It should be noted that any one of the blocks illustrated in the flowchart shown in FIG. 4 may be omitted, rearranged in order, or combined with one or more other blocks.

Figure 5:
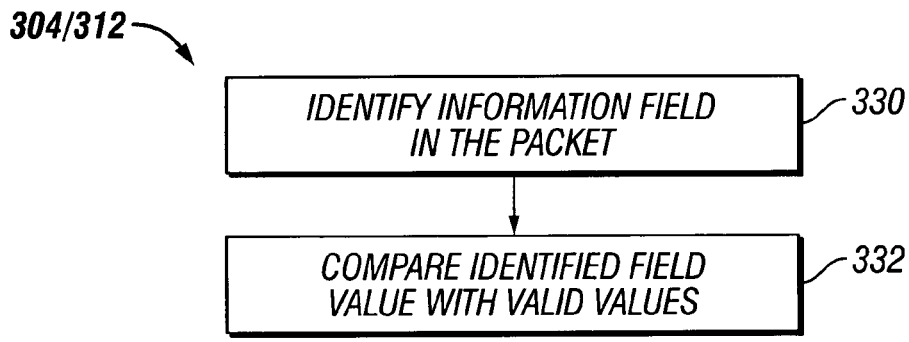
FIG. 5 is a flowchart illustrating another example of the process to determine the integrity of a received packet at block 304 of FIG. 3.

FIG. 5 is a flowchart illustrating another example of the process to determine the integrity of a received packet at block 304, or of a candidate packet at block 312 of FIG. 3. Instead of using a checksum for determining the integrity of a received packet, the process in FIG. 5 verifies values of various data fields contained in the received packet. Packets often contain predefined fields (groups of bits) that represent certain data variables. These fields may have a limited number of valid states depending on the nature of the encoding. Some valid states may depend on the context in which the variable being represented was encoded (e.g., in context aware encoding using CAVLC codes). Knowing the positions of various fields in the packet, the packet field identifier module 220 can identify an information field in the packet at block 330. The packet integrity determiner module 210 can then compare, at block 332, the value of the information field with a list of valid values for the field. In one embodiment, the information field may be located in the header of the data packet. Information fields contained in the packet header may include, for example, a cyclic redundancy check field, a destination identification field, a packet sequence number, and a sequence time field. Other information fields in packet headers and/or packet bodies that can be used to determine packet integrity are known to those of skill in the art.

By comparing more than one field value with a list of valid values, the odds of a false positive integrity check can be reduced. For example, if a certain information field can take on any of twenty values, then checking one value for this field would have a one in twenty chance of having a false positive. However, by checking two fields that have 20 possible values, the odds of a false positive reduce to one in 400. Increasing the number of information fields checked will decrease the odds of a false positive even further. It should be noted that any one of the blocks illustrated in the flowchart shown in FIG. 5 may be omitted, rearranged in order, or combined with one or more other blocks.

Figure 6:
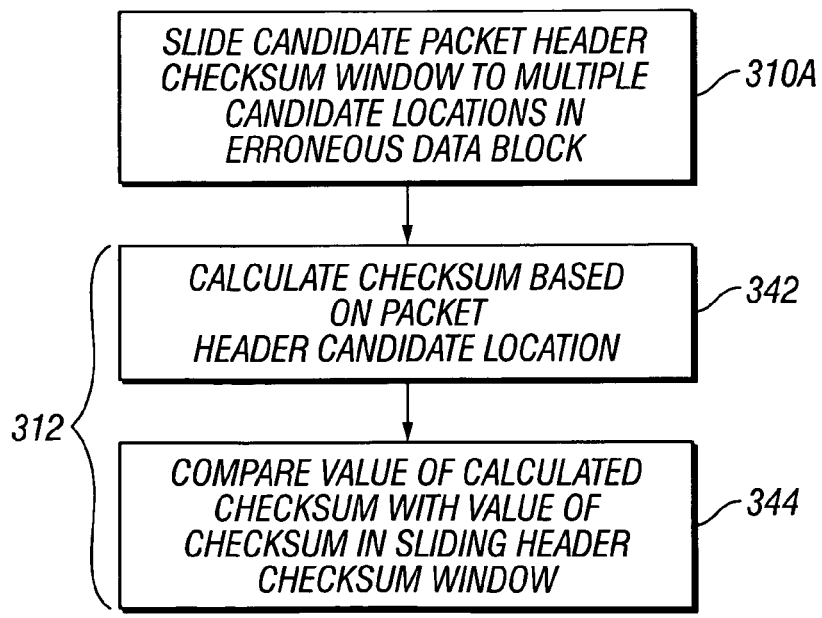
FIG. 6 is a flowchart illustrating an example of the process to determine a candidate packet location at block 310 and to determine the integrity of the candidate packet at block 312 of FIG. 3.

FIG. 6 is a flowchart illustrating an example of the process to determine a candidate packet location at block 310 and to determine the integrity of the candidate packet at block 312 of FIG. 3. The process shown in FIG. 6 searches multiple candidate locations to locate a valid header checksum. This is only an example and those of skill in the art will be able to use the methods shown to locate a packet location based on other integrity check schemes. In this example, the header checksum being searched for is a single byte (eight bits) long. In this example, each packet in the received data block starts with a fixed length header (e.g., eight bytes). Each packet header includes a one byte checksum that is calculated based the contents of the packet header besides the header checksum. The header checksum may be a hash function or a simple additive calculation as discussed above.

After the packet integrity determiner module 210 identifies an erroneous packet (at either decision block 306 or 314), the process 300 continues at block 310A where the packet location identifier module 215 of FIG. 2 positions a candidate packet header checksum window at multiple candidate locations in the data block containing the erroneous packet. Block 310A is one method of performing the acts of block 310 shown in FIG. 3. Blocks 342 and 344 are sub-blocks of one method of performing the acts of block 312 of FIG. 3. In one embodiment, each data block starts with an eight byte header and the initial position of the sliding header checksum window corresponds to the location of the checksum field in the first eight bytes comprising the data block. Since each data block starts with an eight byte header, the location of the single byte checksum within the first 8 bytes may be identified. In another embodiment, the beginning of a data block may not necessarily contain a header and therefore the one byte checksum window may be placed at the first byte of the data block.

Since header checksums are encoded based on standardized (e.g., predetermined) fields within a header and/or a packet, the checksum calculator module 225 of FIG. 2 can calculate a checksum, at block 342, based on the other data positioned relative to the candidate checksum window. The calculation performed by the checksum calculator module 225 is equivalent to what an encoder would have calculated if the data located relative to the candidate window location were the actual packet header information used in an actual checksum encoding operation. Proceeding to block 344, the packet integrity determiner module 210 of FIG. 2 then compares the calculated checksum to the value of the data contained in the candidate checksum window. If the calculated checksum agrees with the value of the data contained in the candidate checksum window, then the integrity of the candidate checksum may be determined to be valid. However, since the checksum in this example is only 8 bits, there is a one out of 256 chance of a false positive. These odds may not be sufficient in some applications and additional integrity checks may be performed (e.g., the information field validity checks as shown in FIG. 5) to reduce the odds of a false positive. If the calculated checksum does not agree with the value in the checksum candidate window, then the candidate window is located to another candidate location in block 310A. The candidate window may be advanced one byte at a time if the data block is byte aligned and the location of the header checksum byte location is known. If the data block is not byte aligned, then the checksum window may be advanced one bit at a time until a valid location is determined.

As one of skill in the art will recognize, depending on the size of the checksum field, among other determining factors, the candidate checksum window may be positioned using various numbers of bits other than a single bit or one byte (8 bits). The example in FIG. 6 utilized a header checksum field as an example only. Other field types may be used to search for candidate locations in order to locate a valid packet. Any field that has a predetermined location within a packet header (or any other known length portion of data), and has an encoded value that depends on data that is located relative to its candidate position, can be used to determine integrity of candidate locations for a packet within the received data block. It should be noted that any one of the blocks illustrated in the flowchart shown in FIG. 6 may be omitted, rearranged in order, or combined with one or more other blocks.

Figure 7:
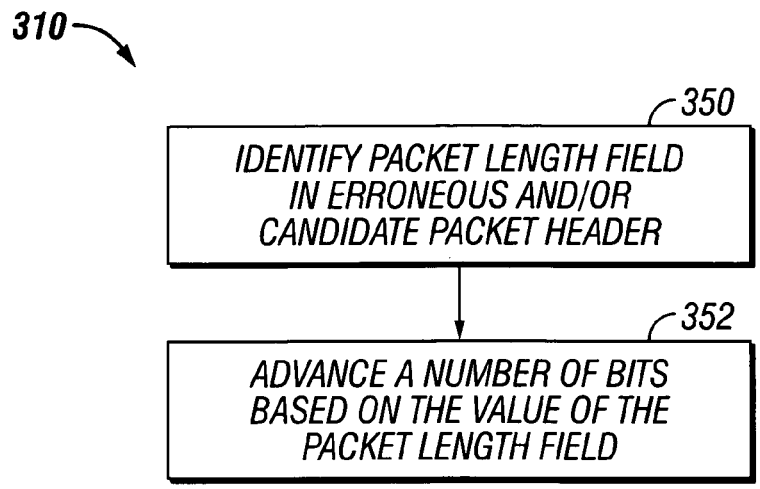
FIG. 7 is a flowchart illustrating another example of the process to determine a candidate packet location at block 310 of FIG. 3.

FIG. 7 is a flowchart illustrating another example of the process to determine a candidate packet location at block 310 of FIG. 3. This example uses a field within a packet header that lists the length of the packet (e.g., the length of the entire packet including the header, or the length of the packet body not counting one or more known length fields within the packet). This method is referred to as a look-ahead. The look-ahead method starts with the packet field identifier module 220 of FIG. 2 identifying a packet length field in an erroneous and/or candidate packet header (or other associated group of data) at block 350. The packet length field may be located at a fixed position in the header (or the assumed location of a candidate header). After identifying the value of the packet length field, the candidate packet location is determined by advancing a number of bits based on the value of the packet length field at block 352. Knowing the length of the current packet identifies the start of the next packet. If the packet length field is not itself erroneous, then the location of the next packet may be correctly determined by this simple procedure.

In one embodiment, the look-ahead method shown in FIG. 7 is performed as a preliminary or simplified search for locating a packet within a data block as a first step after a data packet has been determined to be erroneous at decision block 306. This may be a feasible solution if the corruption that resulted in the erroneous integrity determination was limited to data other than the packet length field. If the packet length field is not erroneous, then advancing to the position in the data stream indicated as the end of the current packet should identify the location of the next packet. An integrity check of the next packet (e.g., using an encoded header checksum) may indicate that the location indicated by the packet length field is valid and the packet may be forwarded and utilized by another process (e.g., an application layer process). Performing additional look-ahead integrity checks can result in reduction of the chances of a false positive.

In another embodiment, the look-ahead method shown in FIG. 7 is performed to reduce the chances of a false positive when trying to locate a packet at blocks 310 and 312 of FIG. 3. This can be done by performing the method of FIG. 7 after locating a possible valid packet location (in blocks 310 and 312) using an integrity check (e.g., using a one byte header checksum) that has a fairly high chance of registering a false positive. For example, if a one byte header checksum candidate window was found to be valid (see FIG. 6), there is still a one in 256 chance that the candidate location is not a location of a valid packet header. By using the packet length field of the current candidate header checksum to identify the location of the next packet header, and performing a second integrity check using the one byte header checksum of the next packet, the odds of a false positive can be reduced to $1/65{,}536$ when the second header checksum is valid. Performing additional look-ahead integrity checks can result in even further reduction of the chances of a false positive. If the integrity check shows that the next header checksum is erroneous, then the candidate location of the current packet may be assumed to be erroneous and the search for the next packet may continue at block 310 of FIG. 3. It should be noted that any one of the blocks illustrated in the flowchart shown in FIG. 7 may be omitted, rearranged in order, or combined with one or more other blocks.

It should be noted that any one of the blocks illustrated in the flowcharts shown in FIGS. 3, 4, 5, 6 and/or 7 may be omitted, rearranged in order, or combined with one or more other blocks. For example, a parallel search can be used for searching for multiple candidate packet locations and determining the integrity of the candidate packet locations. The parallel search approach could be used for performing one or more look-ahead integrity checks as described above in reference to FIG. 7.

Figure 8:
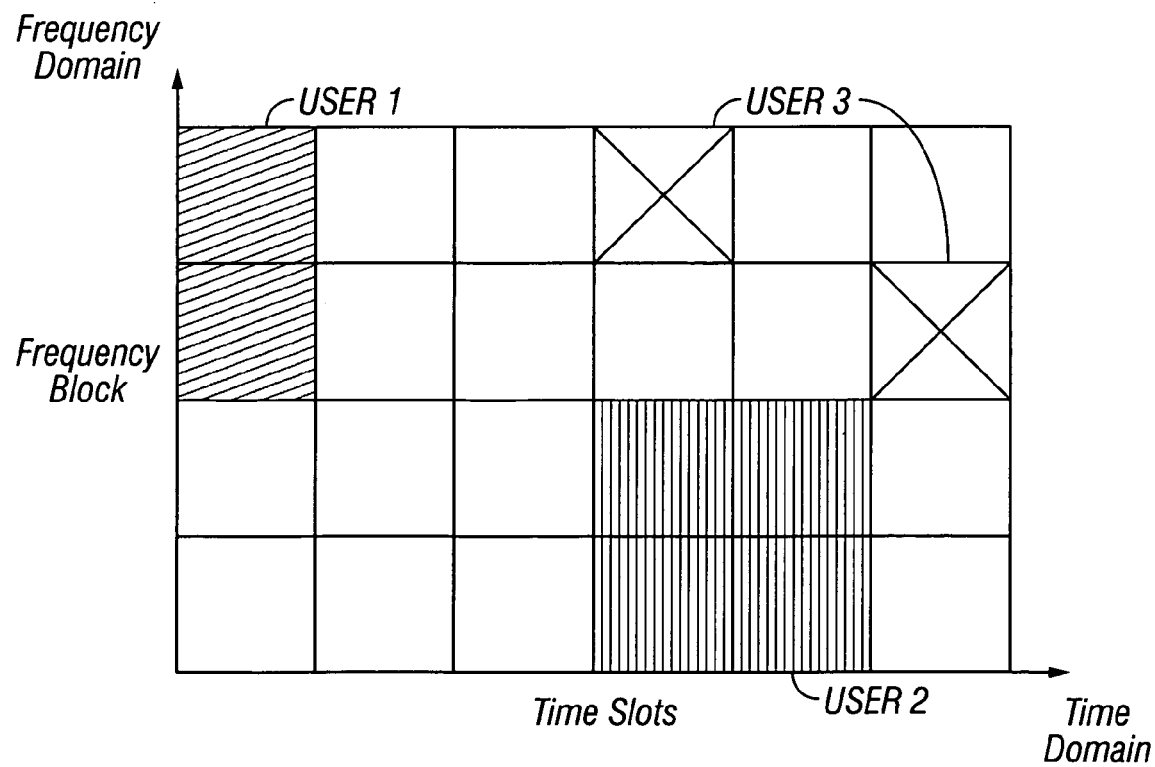
FIG. 8 is an example of a set of allocations of an OFDMA system.

One specific example of a communication system that the process 300 shown in FIGS. 3, 4, 5, 6 and 7 can be used in is an OFDMA system. OFDMA systems typically have allocations that correspond to one or more frequency slot/time slot pairs. One OFDMA system in particular is being developed by the IEEE 802.16 Working Group on Broadband Wireless Access Standards. This 802.16 OFDMA system is referred to as WiMAX (Wireless Metropolitan Area Network). The WiMAX/OFDMA system will be used in this specific example, but those of skill in the art will be able to apply the methods and apparatus to other systems as well. FIG. 8 shows an example of a set of allocations of an OFDMA system. In OFDMA systems, individual users are assigned one or more regions within one or more allocations based on, for example, the bandwidth needs of the user. Since an allocation is made up of a finite frequency and a finite time span, an allocation has a fixed block size to which multiple users may be assigned. In FIG. 8, two allocation regions have been assigned to user 1, four allocation regions have been assigned to user 2, and two allocation regions have been assigned to user 3. In the example shown in FIG. 8, the users are assigned entire allocation regions, however, this is not necessary. An allocation data block (referred to herein as an allocation block) can include data related to multiple connections as defined by a CID (connection ID) number. Each user may be assigned one or more CIDs that will be used in packet headers to identify packets targeted for that user. A communication device will generally receive all of the data contained in an allocation block and then determine which packets are targeted to it by identifying the packets containing the assigned CID numbers. Encryption can be used to inhibit other users from decoding the packets targeted to a specific user.

Allocation blocks include variable length and/or fixed length packets, both of which are referred to generally as packet data units (PDU). In some embodiments (e.g., the WiMAX/OFDMA system), each data block corresponding to an allocation starts with a PDU header. In these embodiments, the PDUs may not span multiple allocation blocks due to the required header alignment at the start of the allocation block.

Figure 9:
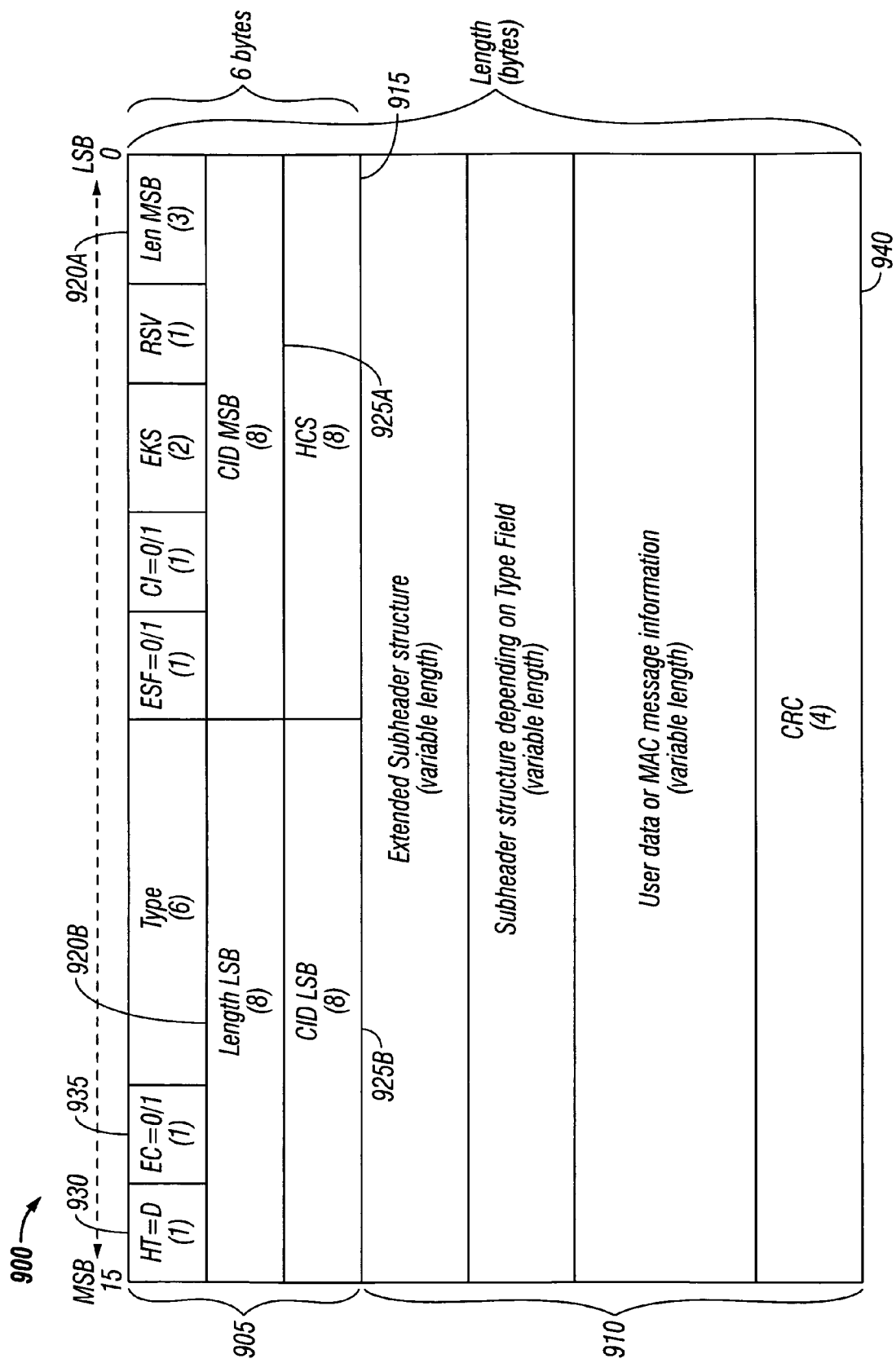
FIG. 9 is a variable length PDU as may be contained within allocation blocks of an OFDMA system.

FIG. 9 shows a variable length PDU used in allocation blocks of the WiMAX/OFDMA system. The PDU 900 is made up of a six byte packet header 905 and a variable length packet body 910. The packet header 905 contains several fields including, but not limited to, a one byte header checksum field 915, an 11 bit packet length field 920 (comprising a most significant bits, MSB, portion 920A and a least significant bits, LSB, portion 920B), and a two byte CID field 925 (comprising a most significant bits portion 925A, and a least significant bits portion 925B). The packet body 910 contains sections that contain data including extended headers, subheaders, user data (e.g., data targeted for various application layer components), and a 4 byte CRC field 940. Fixed length packets (not shown in FIG. 9) are also used in OFDMA systems, mainly for messaging and/or signaling, and they comprise some common fields with the variable length packets including the header checksum field 915, and the CID fields 925A and 925B. Both fixed length PDUs and variable length PDUs contain a single bit header type (HT) field 930, and a single bit encryption enabled (EC) field 935. The HT/EC fields 930/935 can be used to indicate if the PDU is a 6-byte fixed length PDU or a variable length PDU (e.g., HT=1 indicates a 6 byte fixed length PDU), and to indicate if the packet is encrypted (e.g., EC=1). It should be noted that the fixed length messaging PDUs do not contain the 4 byte CRC field 940.

Figure 10:
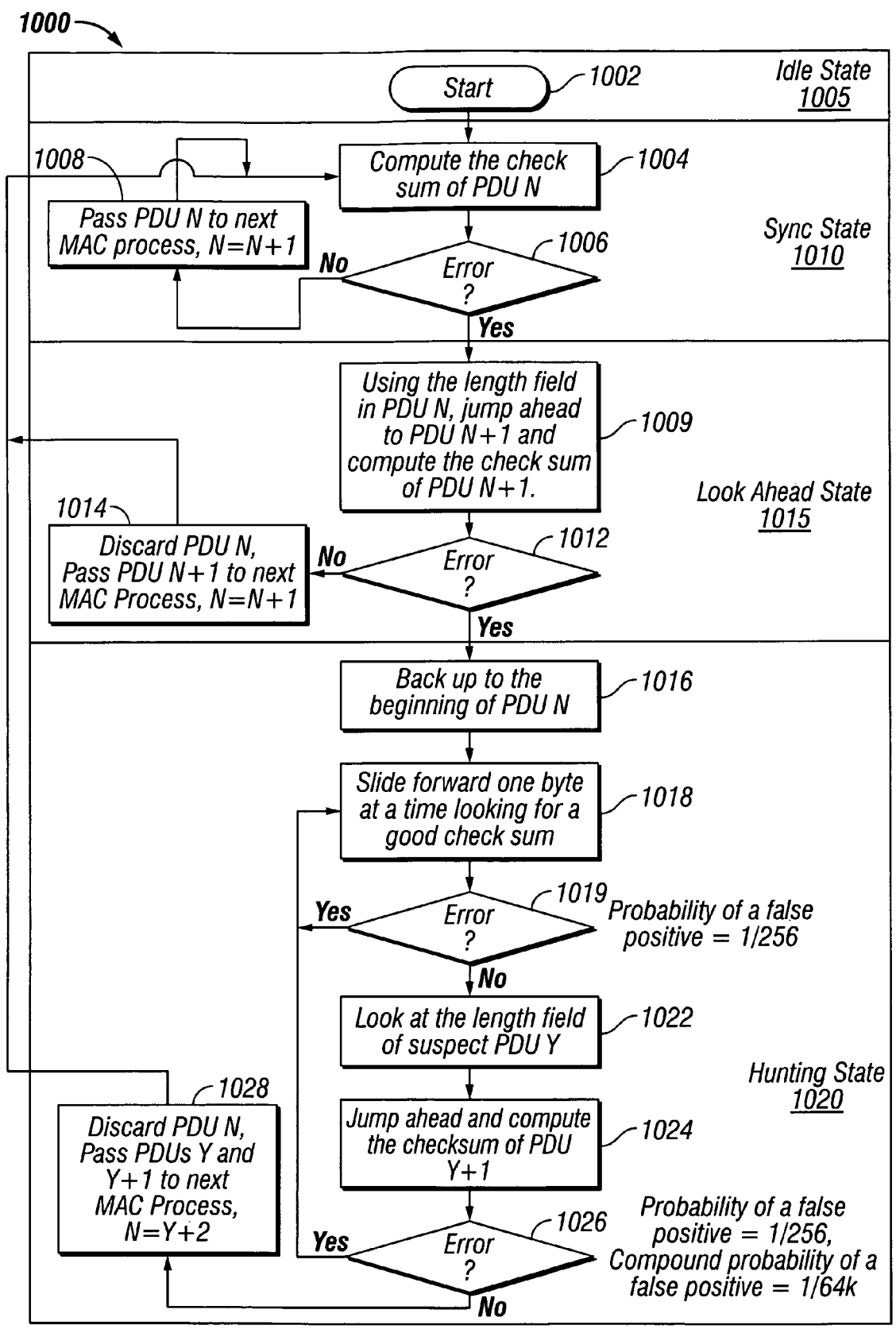
FIG. 10 is a flowchart illustrating certain blocks in a method of processing digital data streams with error management in an OFDMA system.
Figure 11:
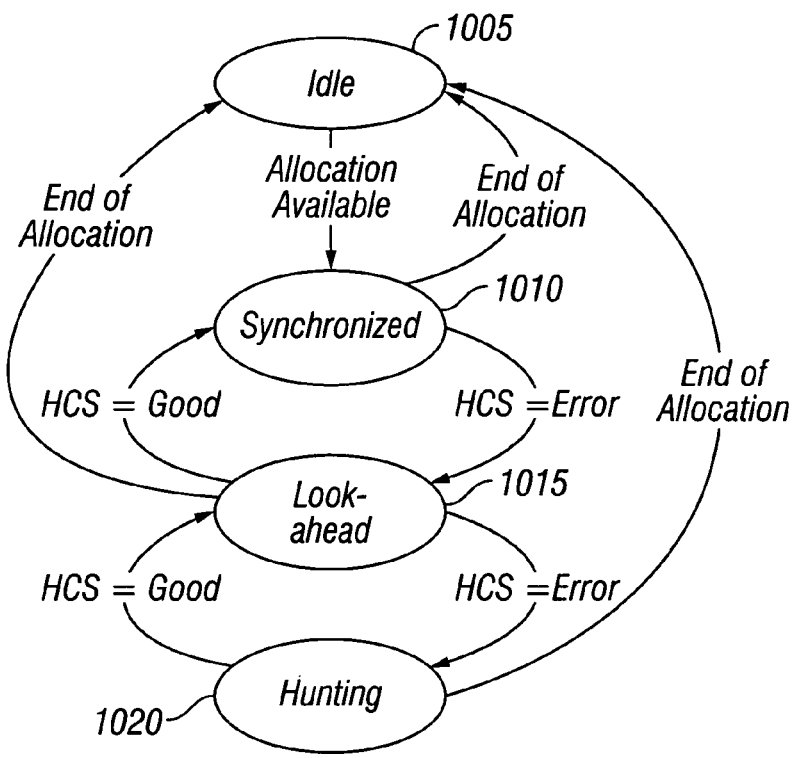
FIG. 11 is a flow diagram of a finite state machine implementation of the method of FIG. 10

A specific example of the process 300 shown in FIGS. 3, 4, 5, 6 and 7, that is directed to the OFDMA system discussed above will now be discussed. FIG. 10 is a flowchart illustrating certain blocks in a method of processing digital data streams with error management in an OFDMA system. FIG. 11 is a flow diagram of a finite state machine implementation of the method of FIG. 10. The process 1000 enables resynchronization of a data stream comprising multiple variable length PDUs after an erroneous PDU is detected. The process 1000 may be performed by the communication device 200 shown in FIG. 2. As discussed above, PDUs are aligned to the start of an allocation block. If a PDU in the allocation block is determined to be erroneous (e.g., using an integrity check of the header checksum field 915), the process 1000 is able to resynchronize to find another good PDU in the allocation block rather than discarding all the remaining data in the allocation block and resynchronizing at the next allocation block. The process 1000 operates on the MAC header of the WiMAX/OFDMA PDU shown in FIG. 9. The MAC header is 6 bytes long with the last byte being the header checksum field 915 which, in this case, is a CRC. If a bad header checksum is encountered, synchronization is recovered only after a good header has been discovered.

With reference to FIGS. 10 and 11, the process 1000 starts (see block 1002 in FIG. 10) in an idle state 1005, where it stays until an allocation block is available to be received. When an allocation block is available, the process 1000 proceeds to a synchronized (sync) state 1010. In the sync state 1010, the PDU boundaries are identifiable. Referring to FIG. 9, utilizing the PDU length fields 920, and/or the HT field 930 in combination with the EC field 935, the allocation block may be partitioned into fixed length and variable length PDUs. As discussed above, the HT/EC field 930/935 can be used to indicate if the PDU is a 6-byte fixed length PDU or variable length PDU. The length field 920 indicates the length of the variable length PDUs (e.g., in bytes). Proceeding to block 1004, the checksum calculator 225 of FIG. 2 computes the header check sum of a PDU (e.g., PDU "N" in this example) contained in the allocation block based on the five bytes of data contained in the PDU header that precede the header checksum 915 (see header 905 in FIG. 9). If the computed checksum does not match the checksum received in the PDU, then the PDU is determined to be in error at decision block 1006 and the process 1000 proceeds to a look-ahead state 1015. Referring again to the decision block 1006, if the computed checksum matches the received checksum, then the process 1000 remains in the sync state 1010 and proceeds to block 1008 to pass the PDU "N" to another component for subsequent processing (e.g., a parser). The process 1000 then returns to block 1004 to compute the checksum of the next PDU, "N+1". The remaining PDUs in the allocation block will continue to be checked for integrity by repeating blocks 1004 and 1006 until there are no more PDUs remaining in the allocation block. The process 1000 returns to the idle state 1005 when no more PDUs remain in the allocation block.

The look-ahead state 1015 performs a look-ahead check similar to that shown in FIG. 7 and discussed above. The look-ahead check can locate the next PDU quickly if the portion of the PDU header containing the packet length field is uncorrupted. Proceeding to block 1009, the PDU length field 920 (comprised of MSB portion 920A and LSB portion 920B in FIG. 9) is used to advance or jump ahead in the allocation block to the bit indicated by the value in the length field 920. The process 1000 then computes a checksum for the header indicated by the look-ahead jump block 1009). At decision block 1012, if the computed header checksum does not match the header checksum of the look-ahead PDU header, then the process 1000 transitions to a hunting state 1020 to perform a more rigorous search for the next PDU. Referring again to the decision block 1012, if the look-ahead PDU header checksum does match the computed checksum (indicating a valid PDU), then the process 1000 discards the original erroneous PDU "N", and passes the look-ahead PDU (the "N+1" PDU in this case) to another MAC component for subsequent processing at block 1014. After passing the candidate PDU to another component, the process 1000 returns to the sync state 1010 where the remaining PDUs in the allocation block are checked for integrity in blocks 1004, 1006 and 1008.

The hunting state 1020 comprises a search similar to that shown in FIG. 6, but in conjunction with a look-ahead check similar to that of the look-ahead state 1015 and to that shown in FIG. 7 (along with the integrity determination block 312 shown in FIG. 3). The combination of the two integrity checks included in the methods of FIG. 6 (blocks 342 and 344) and FIG. 7 (block 12 in FIG. 3), serve to reduce the possibility of a false positive in locating a valid candidate PDU header.

Starting at block 1016, the hunting state 1020 begins by backing up to the beginning of the current erroneous PDU "N" to begin searching for a valid PDU header of the next PDU "Y". The next PDU is labeled "Y" in this example since the corruption may corrupt the next PDU immediately following PDU "N", therefore, the next located PDU "Y" may be the first, second, third or further PDU after the erroneous PDU "N". Since the PDUs are byte aligned with the end of the last valid PDU, the search can progress at block 1018 by sliding a one byte header checksum window, one byte at a time, looking for a valid checksum. In other embodiments where the header checksum window is not byte aligned (e.g., in the first portion of a data block where packets may overlap multiple data blocks as discussed above), the search may progress one bit at a time. In the example using the header 905 shown in FIG. 9, the header checksum window is first positioned at the sixth byte of the current erroneous PDU "N". At a decision block 1019, an integrity check is made by computing a checksum based on the previous 5 bytes and comparing the computed checksum to the value in the header checksum window. Referring again to the decision block 1019, if the integrity check indicates an erroneous checksum, then the search continues at block 1018 by sliding the header checksum window to the next candidate location (e.g., by advancing one byte as in this example). The window sliding at block 1018 and the integrity decision at block 1019 continue until a valid header location of the next PDU "Y" is determined.

If the integrity check at block 1019 indicates a valid PDU "Y", the process 1000 continues on to the look-ahead check at block 1022 where the PDU length field 920 is identified (e.g., with the packet field identifier 220 shown in FIG. 2). Continuing to block 1024, the PDU length field 920 is use to advance or jump ahead in the allocation block the number of bytes indicated by the value of the PDU length field 920. This is the preliminary location of the second PDU "Y+1" after the current erroneous PDU "N". In reference to a block 1026, an integrity check of the header checksum of the "Y+1" PDU is made by computing a checksum based on the preliminary "Y+1" header and comparing it to the header checksum field 915 contained in the "Y+1" header. If the integrity check at block 1026 indicates an erroneous "Y+1" PDU header, then the "Y+1" PDU header as well as the "Y" PDU header are assumed to be erroneous and the process 1000 returns to block 1018. At block 1018, the search for the "Y" PDU header checksum is resumed. The look-ahead check at blocks 1022, 1024 and 1026 can be omitted in some embodiments if the odds of a false positive at block 1019 are sufficiently low. In this example, with an 8 bit checksum, the odds of a false positive are fairly high at $1/256$ and may warrant the look-ahead check. By performing the second 8 bit header checksum integrity check at the decision block 1026, the odds of a false positive are reduced to $1/65,536$ for a valid integrity check at the decision block 1026.

If the integrity check at the decision block 1026 indicates a valid "Y+1" PDU header, then the "Y+1" PDU and the "Y" PDU are both assumed valid. Continuing to block 1028, the erroneous PDU "N" is discarded and the "Y" and "Y+1" PDUs are forwarded to another MAC component for subsequent processing. Thus, the hunting state 1020 is completed and the process 1000 transitions back to the sync state 1010 at block 1004 to start integrity checks on the next PDU "N=Y+2". Additional look-ahead checks and/or other integrity checks may be performed before exiting the hunting state 1020, depending on the embodiment.

In one embodiment, process 1000 of FIG. 10 can be expanded to include repair and recovery of some erroneous PDUs. Using the PDU structure shown in FIG. 9 as an example and assuming a single bit error, when PDU "N" has an HCS error, there is an 8 out of 48 or 1 out of 6 probability that the erroneous bit is in the 8 bit HCS field 915 and not in the information carrying fields of the header 905. Again referring to FIG. 9, there is an 11 out of 48 probability that a single bit error is in the eleven-bit length field 920 (comprised of the 3-bit field 920A and the 8-bit field 920B). At step 1012 of process 1000, a determination is made that the length field 920A, 920B is error free increasing the likelihood that the single bit error is in the HSC 915 to an 8 out of 37 probability. Step 1014 can be enhanced to re-compute the HCS based on the bits present in header 905 and process PDU N for forwarding to the higher layers. Since not all combinations of bits in the other fields are valid, for example the CID space is not exhausted, the likelihood of forwarding a bad packet to the upper layer can be further reduced. For upper layer protocols that are tolerant of corrupt or erroneous packets, more than 20% of the erroneous PDUs may be repaired and recovered. Additionally, at step 1028 of process 1000, there is very high confidence that the length field 920A, 920B of PDU "N" was corrupt. Step 1028 can be enhanced to repair the length field 920A, 920B of PDU "N" based on the location of the PDU "Y" that was identified at step 1018. The process 1000 may then proceed to recheck the unmodified HCS field 915. In this case, if there is no error in the HCS check using the repaired length field 920A, 920B, PDU "N" has a very high likelihood of being correct an can be processed for forwarding to the upper layers, resulting in greater than 20% of erroneous packets being repaired and recovered with very little likelihood of forwarding a corrupt packet to the higher layers.

Figure 12:
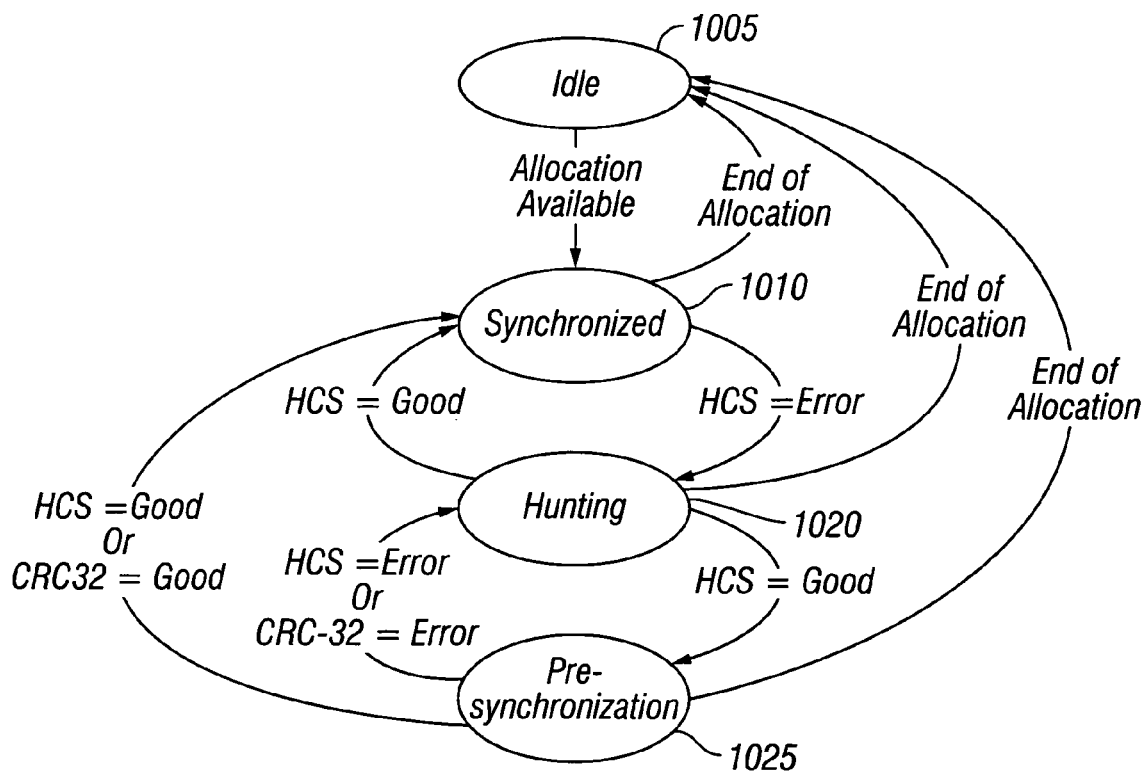
FIG. 12 shows a flow diagram of a finite state machine implementation of another embodiment of the method of FIG. 10.

FIG. 12 is a flow diagram of a finite state machine implementation of another embodiment of the method of FIG. 10. In this embodiment, the look-ahead state 1015 containing the blocks 1009, 1012 and 1014 of FIG. 10, is omitted. The idle state 1005 and the sync state 1010 containing the blocks 1002, 1004, 1006, and 1008 can remain unchanged from FIGS. 10 and 11. The hunting state 1020 of FIG. 12 starts when the process 1000 reaches block 1016 due to an erroneous PDU being detected at the decision block 1006. The hunting state 1020 of the embodiment in FIG. 12 can include blocks 1016, 1018 and 1019 of FIG. 10. Blocks 1016, 1018 and 1019 can be performed in a similar way to that discussed above in order to locate the preliminarily valid next PDU "Y". However, blocks 1022, 1024 and 1026 of the hunting state 1020 in FIGS. 10 and 11 are omitted in the hunting state of FIG. 12. After identifying the next PDU "Y" in the allocation block, the process 1000 transitions to a pre-synchronization state 1025 before returning to the sync state 1010.

The pre-synchronization state 1025 is used to confirm that the PDU header indicated as valid in the hunting state 1020 is in fact a valid header. While in the pre-synchronization state 1025, the process 1000 may perform an integrity check of the candidate PDU "Y" using the 4 byte CRC field 940 shown in FIG. 9. The odds of a false positive integrity check using a 32-bit CRC are less than $\frac{1}{4} \times 10^9$. If this integrity check indicates an erroneous PDU "Y", then the hunting state 1020 resumes to locate the next candidate header location. If the 32-bit CRC check indicates a valid PDU "Y", then the process 1000 discards the erroneous PDU "N" and the "Y" PDU is forwarded to another MAC component for subsequent processing (see block 1028 in FIG. 10). The process then transitions back to the sync state 1010.

In another embodiment, the pre-synchronization state 1025 can include the look-ahead check of blocks 1022, 1024 and 1026 as shown in FIG. 10. This embodiment is useful for confirming validity of a PDU that does not contain a 32-bit CRC field 940 (e.g., a fixed length signaling PDU). In this embodiment the look-ahead check verifies the one byte header checksum (HCS) of the "Y+1" PDU instead of the 32 bit CRC check of the "Y" PDU. Other combinations of checksum, CRC, and/or valid field values will be recognized readily by those of skill in the art.

It should be noted that any one of the blocks and/or states illustrated in the flowcharts and/or state diagrams shown in FIGS. 10, 11 and/or 12 may be omitted, rearranged in order, or combined with one or more other blocks and/or states.

The processes discussed above in reference to FIGS. 10, 11 and 12 use allocation blocks as examples of blocks of data that the process 1000 may operate on. However, other blocks of data may also be used. For example, a decoder device typically has a forward error correction (FEC) component that operates on fixed block sizes. There are many types of block codes, such as Reed-Solomon, Golay, BCH and Hamming codes. An allocation block may be broken up (e.g., parsed) into multiple FEC blocks. The data from the decoded FEC blocks may then be processed by the process 1000 (or the process 300 of FIG. 3). The parsed FEC blocks may be operated on independently or segmented back together to form all or part of the allocation block (and the associate PDU's contained within) that was parsed by the FEC component. In cases where allocation blocks are parsed into other blocks (e.g., the FEC blocks), the process 1000 (or the process 300) can be informed of which FEC blocks are associated with an allocation block by the communication of an allocation ID as well as information identifying the number of FEC blocks that make up an allocation block. In this way the process 1000 (or the process 300) can distinguish between multiple allocations for multiple users and/or multiple application components.

An embodiment provides an apparatus for processing a data stream comprising a plurality of variable length packets. The apparatus includes means for determining an integrity of a first packet, and means for identifying, a location of a second packet, in response to determining the integrity of the first packet to be erroneous. With reference to FIG. 2, aspects of this embodiment include where the determining means is the packet integrity determiner module 210, and the identifying means is the packet location identifier module 215.

Another embodiment provides an apparatus for processing a data stream comprising an allocation block having a known length, where the allocation block comprises a plurality of variable length packet data units (PDU). The apparatus includes means for computing a checksum of a first PDU in the allocation block, means for determining the integrity of the first PDU by comparing the computed checksum to a header checksum contained in a header of the first PDU, and means for identifying a location of a second PDU in the allocation block in response to determining the integrity of the first PDU to be erroneous. With reference to FIG. 2, aspects of this embodiment include where the computing means is the checksum calculator module 225, the identifying means is the packet location identifier module 215, and the determining means is the packet integrity determiner module 210.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of processing a data stream comprising a plurality of variable length packets, the method comprising:
   identifying an encoded checksum based on at least a portion of a first packet, wherein the first packet comprises a header having a packet length field and the encoded checksum is based on at least a portion of the header;
   calculating a second checksum based on the at least the portion of the header of the first packet;
   determining an integrity of the first packet by determining the packet to be erroneous if the second checksum does not match the encoded checksum; and
   in response to determining the integrity of the first packet to be erroneous:
      identifying a second packet at a location indicated by the packet length field of the first packet:
      determining that the packet length field of the first packet is correct on a condition that the second packet is identified at the location indicated by the packet length field of the first packet; and
      processing the first packet as not erroneous on a condition that the packet length field of the first packet is determined to be correct.

2. The method of claim 1, wherein the variable length packets are contained in a data block having a known length.

3. The method of claim 2, wherein the data block having a known length corresponds to an allocation region of an orthogonal frequency division multiple access (OFDMA) system.

4. The method of claim 1, further comprising:
determining multiple candidate locations in a header of a packet other than the first packet;
identifying a first candidate encoded checksum for each of the multiple locations;
calculating a second candidate checksum for each of the multiple locations based on a portion of the header of the packet other than the first packet that the encoded checksum is based on,
wherein identifying the second packet at the location indicated by the packet length field of the first packet comprises identifying a location of a header of the second packet that results in the calculated second candidate checksum matching the identified first candidate encoded checksum.

5. The method of claim 1, wherein the method further comprises:
in response to determining the first packet to be erroneous:
determining that the packet length field of the first packet is erroneous;
correcting the packet length field;
calculating a third checksum for the packet header using the corrected packet length field; and
discarding the first packet if the third checksum does not match the encoded checksum.

6. A method of processing a data stream comprising an allocation block having a known length, the allocation block comprising a plurality of variable length packet data units (PDUs) comprising a header with a packet length field and a header checksum, the method comprising:
computing a checksum of a first PDU in the allocation block;
determining the integrity of the first PDU by comparing the computed checksum to the header checksum of the first PDU; and
in response to determining the integrity of the first PDU to be erroneous:
identifying a second PDU in the allocation block at a location indicated by the packet length field of the first PDU;
identifying that a value of the packet length field contained in the header of the first PDU is correct on a condition that the second PDU is identified at the location indicated by the packet length field of the first PDU; and
processing the first PDU as not erroneous on a condition that the value of the packet length field contained in the header of the first PDU is determined to be correct.

7. The method of claim 6, wherein identifying the location of the second PDU comprises advancing a number of bits in the data stream based on the identified packet length field value.

8. The method of claim 7, further comprising determining an integrity of the second PDU.

9. The method of claim 8, further comprising:
in response to determining the integrity of the second PDU to be valid, discarding the first PDU and passing the second PDU to a next process.

10. The method of claim 6, wherein identifying the location of the second PDU comprises:
computing candidate checksums for a plurality of candidate header locations of the second PDU, wherein the candidate header locations are determined by sliding a candidate header checksum window forward an N number of bits at a time, and further wherein N is an integer;
determining integrity of the plurality of candidate header locations of the second PDU by comparing the computed candidate checksums to header checksums within the candidate headers; and
identifying the location of the second PDU to be one of the plurality of candidate header locations resulting in a valid checksum comparison.

11. The method of claim 10, in response to identifying the location of a valid second PDU, the method further comprising:
identifying a value of a packet length field contained in the header of the second PDU;
identifying the location of a third PDU by advancing a number of bits in the data stream based on the identified packet length field value;
computing a checksum of the third PDU; and
determining an integrity of the third PDU by comparing the computed checksum of the third PDU to a header checksum within a header of the third PDU.

12. The method of claim 11, further comprising:
in response to determining the integrity of the third PDU to be valid, discarding the first PDU and passing the second PDU to a next process.

13. The method of claim 11, further comprising:
determining that the packet length field of the first PDU is erroneous;
correcting the packet length field of the first PDU;
computing the checksum for the first PDU using the corrected packet length field; and
discarding the first PDU if the checksum computed using the corrected packet length field does not match the checksum contained in the header of the first PDU.

14. A communication apparatus to process a data stream comprising an allocation block having a known length, the allocation block comprising a plurality of variable length packet data units (PDUs) comprising a header with a packet length field and a header checksum, the apparatus comprising:
a memory device; and
a processor configured to communicate with the memory device, the processor further configured to compute a checksum of a first PDU in the allocation block, to determine the integrity of the first PDU by comparing the computed checksum to the header checksum of the first PDU, and in response to determining the integrity of the first PDU to be erroneous:
to identify a second PDU in the allocation block at a location indicated by the packet length field of the first PDU,
to identify that a value of the packet length field contained in the header of the first PDU is correct on a condition that the second PDU is identified at the location indicated by the packet length field of the first packet, and
to process the first PDU as not erroneous on a condition that the value of the packet length field contained in the header of the first PDU is correct.

15. The communication apparatus of claim 14, wherein the processor is further configured to determine an integrity of the second PDU.

16. The communication apparatus of claim 15, where in response to determining the integrity of the second PDU to be valid, the processor is further configured to discard the first PDU and pass the second PDU to a next process.

17. The communication apparatus of claim 15, wherein the processor is further configured to determine that the packet length field of the first PDU is correct when the integrity of the second PDU is determined to be valid, and to process the first packet as not erroneous.

18. The communication apparatus of claim 14, wherein the processor is further configured to compute candidate checksums for a plurality of candidate header locations of the second PDU, wherein the candidate header locations are determined by sliding a candidate header checksum window forward an N number of bits at a time, and further wherein N is an integer, to determine integrity of the plurality of candidate header locations of the second PDU by comparing the computed candidate checksums to header checksums within the candidate headers, and to identify the location of the second PDU to be one of the plurality of candidate header locations resulting in a valid checksum comparison.

19. The communication apparatus of claim 18, where in response to identifying the location of a valid second PDU, the communication apparatus is further configured to identify a value of a packet length field contained in the header of the second PDU, to identify a location of a third PDU by advancing a number of bits in the data stream based on the identified packet length field value, to compute a checksum of the third PDU, and to determine an integrity of the third PDU by comparing the computed checksum of the third PDU to a header checksum within a header of the third PDU.

20. The communication apparatus of claim 19, where in response to determining the integrity of the third PDU to be valid, the processor is further configured to discard the first PDU and pass the second PDU to a next process.

21. The communication apparatus of claim 19, wherein the processor is further configured to determine that the packet length field contained in the header of the first PDU is erroneous, to correct the packet length field contained in the header of the first PDU, to compute a checksum of the header of the first PDU using the corrected packet length field, and to discard the first PDU if the checksum computed using the corrected packet length field does not match the encoded checksum.

* * * * *